United States Patent Office 3,532,671
Patented Oct. 6, 1970

3,532,671
ACETYLACETONATE TRANSESTERIFICATION CATALYSTS
Otto K. Carlson, Marcus Hook, and John A. Price, Swarthmore, Pa., assignors to FMC Corporation, Philadelphia, Pa., a corporation of Delaware
No Drawing. Filed Aug. 30, 1967, Ser. No. 664,254
Int. Cl. C08g 17/013, 17/015
U.S. Cl. 260—75  4 Claims

ABSTRACT OF THE DISCLOSURE

A process of preparing polyethylene terephthalate comprising resin carrying out a transesterification reaction between dimethyl terephthalate and ethylene glycol in the presence of a transesterification catalyst selected from the group consisting of cerium acetyl-acetonate and lead acetylacetonate to form a polyester prepolymer, and then polycondensing the resulting polyester prepolymer in the presence of a conventional polycondensation catalyst.

---

This invention relates to a method of preparing highly polymeric linear polyesters. More particularly, it relates to an improved method of preparing polyethylene terephthalate resin through the use of a novel transesterification catalyst.

The manufacture of polyester resin from a dialkyl terephthalate and a diol is well-known in the art. Generally, in the preparation of such polyesters, a dialkyl terephthalate and a diol are first combined and subjected to an ester-interchange or transesterification reaction in the presence of a transesterification catalyst at elevated temperature and atmospheric pressure. The resulting product or prepolymer is then polycondensed at higher temperatures and under reduced pressure in the presence of a polycondensation catalyst to form the desired polyester resin.

Many catalysts have been suggested heretofore for use in the transesterification step. However, in general, none of these has proven entirely satisfactory, since many of those known do not act to form polyester resins having a combination of properties which make them particularly well suited for the production of melt spun filaments. It is considered that a polyethylene terephthalate resin having a carboxyl content value of below 50 equivalents per million grams (eq./$10^6$ gr. or meq./kg.), a melting point of preferably at least about 258–260° C., a diethylene glycol content of less than 1% by weight, and an intrinsic viscosity preferably not less than 0.60 (as determined in a 60% phenol and 40% tetrachloroethane solution, wt./wt., at 30° C.) is desired in order to produce fibers which possess satisfactory high levels of hydrolytic stability, heat stability, ultra-violet light stability and a high degree of tenacity. Obviously, the lower the diethylene glycol content of the resin produced, the more desirable the resin for filament-forming purposes, inasmuch as the diethylene glycol content is an indication of the amount of ether linkages in the polymer chain which are undesirable due to the fact that such sites in the polymer chain are vulnerable to hydrolytic and thermal action.

Additionally, it is essential that the polyester resin be produced in the shortest possible time and the desired degree of polymerization be obtained. One way of evaluating the effectiveness of the transesterification catalyst is by measuring the "half-time" of the catalyst. The half-time is defined as the time necessary for the first one-half of the theoretical amount of methyl alcohol that will be produced from the transesterification reaction to distill from the transesterification mixture. It is desirable that the half-time be as short as possible, preferably less than 60 minutes, however, it is essential, in any case, that the transesterfication catalyst acts to bring about the formation of a suitable polyester prepolymer for condensation into a highly polymeric polyester.

It is an object of this invention to prepare polyester resin by a transesterification and polycondensation process.

An additional object of the present invention is to provide an improved method for carrying out the transesterification reaction between ethylene glycol and dimethyl terephthalate in the preparation of polyethylene terephthalate.

These and other objects are accomplished in accordance with the present invention which involves a method of preparing polyethylene terephthalate wherein dimethyl terephthalate and ethylene glycol are transesterified and the resulting transesterified product is polycondensed in the presence of a polycondensation catalyst, the improvement comprising carrying out the said transesterification reaction in the presence of a catalytic amount of a compound selected from the group consisting of cerium acetylacetonate and lead acetylacetonate.

Generally, concentrations of the present transesterification or ester-interchange catalysts in the range of from about 0.01% to about 0.20%, based on the weight of dimethyl terephthalate in the subject dimethyl terephthalate-ethylene glycol reaction mixture, are used. Usually, it has been found that from about 0.02% to about 0.1% of the present acetylacetonate transesterification catalysts, based on the weight of dimethyl terephthalate in the reaction mixture, is preferred to produce the linear polyester resins of the present method. Higher or lower concentrations of the present catalyst can also be used. However, when concentrations less than the above are used, their catalytic effect is generally reduced, whereas if greater concentrations than this are used, no further improvement in the present method or desired product is obtained.

In general, the preparation of filament-forming polyesters of the present invention via the ester-interchange reaction is carried out with a molar ratio of ethylene glycol to dimethyl terephthalate of from about 1:1 to about 15:1, but preferably from about 1.2:1 to about 2.6:1. The ester-interchange reaction is generally carried out at atmospheric pressure in an inert atmosphere, such as nitrogen, initially at a temperature range of from about 125° C. to about 250° C., but preferably between about 150° C. and 200° C. in the presence of an ester-interchange catalyst. During this first stage, methyl alcohol is evolved and is continually removed by distillation. After a reaction period of about one to three hours, the temperature of the reaction mixture is raised from 200° C. to about 300° C. for approximately ½ to 2 hours in order to complete the reaction and distill off excess glycol which has been produced and induce polycondensation. The main product of the ester-interchange reaction is comprised principally of bis(2-hydroxyethyl)terephthalate. The second stage or polycondensation step of the present method is generally achieved under reduced pressure within the range of from about 225° C. to about 325° C. for about 3–5 hours.

The polycondensation step of the present invention is generally accomplished through the addition of a suitable catalyst, for example, antimony trioxide and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactants.

The following examples of several preferred embodiments will further serve to illustrate the present invention. All parts are by weight, unless otherwise indicated.

EXAMPLE I

A mixture comprising 600 grams of dimethyl terephthalate, 396 mls. of ethylene glycol, and 0.24 gram of cerium acetylacetonate, $Ce(C_5H_7O_2)_3$, was charged into a reaction vessel equipped with a nitrogen inlet, a distillation arm, heating means, and stirring means. The reaction mixture was agitated and heated at atmospheric pressure to about 197° C. over period of about 30 minutes under a nitrogen blanket whereby by-product methyl alcohol was distilled off. The reaction mixture was held at 197° C. for about 2 hours. Then, the temperature of the reaction mixture was allowed to rise in order to distill off any remaining by-product, comprising methyl alcohol and excess ethylene glycol, and form the desired polyester prepolymer product. After about 30 minutes, the temperature had risen to 230° C., at which time the prepolymer formed was cooled under an atmosphere of nitrogen. The half-time of the cerium acetyl-acetonate catalyst was 33 minutes. The polyester prepolymer produced had a carboxyl content value of less than 2 (meq./kg.) and a diethylene glycol content of 0.56%.

EXAMPLE II

Fifty grams of the prepolymer product of Example I was combined with 0.02 gram of antimony trioxide in a reaction vessel equipped with a nitrogen inlet, a vacuum source, a distillation arm, stirring means, and heating means. The pressure within the reaction vessel was reduced to about 0.1 mm. of mercury at 285° C. under a nitrogen blanket and the reaction mixture was maintained under these conditions for about three hours under agitation, to bring about the polycondensation of the prepolymer and formation of the polyester resin.

The resulting polyester resin product had an intrinsic viscosity of 1.09, a carboxyl content value of 18 (meq./kg.), a melting point of about 263° C., and a diethylene glycol content of 0.77%.

EXAMPLE III

A mixture comprising 600 grams of dimethyl terephthalate, 396 mls. of ethylene glycol and 0.24 gram of lead acetylacetonate, $Pb(C_5H_7O_2)_2$, was charged into a reaction vessel equipped with a nitrogen inlet, a distillation arm, heating means, and a stirring means. The reaction mixture was agitated and heated at atmospheric pressure to about 197° C. over a period of about 30 minutes under a nitrogen blanket whereby by-product methyl alcohol was distilled off. The reaction mixture was held at 197° C. for about 2 hours. Then, the temperature of the reaction mixture was allowed to rise in order to distill off any remaining by-product, comprising methyl alcohol and excess ethylene glycol, and form the desired polyester prepolymer product. After about 30 minutes, the temperature had risen to 230° C., at which time the prepolymer formed was cooled under an atmosphere of nitrogen. The half-time of the lead acetylacetonate catalyst was 18 minutes. The resulting polyester prepolymer had a diethylene glycol content of 0.41% and a carboxyl content value of 4 (meq./kg.).

EXAMPLE IV

Fifty grams of the prepolymer product of Example III was combined with 0.02 gram of antimony trioxide in a reaction vessel equipped with a nitrogen inlet, a vacuum source, a distillation arm, stirring means, and heating means. The pressure within the reaction vessel was reduced to about 0.1 mm. of mercury at 285° C. under a nitrogen blanket and the reaction mixture was maintained under these conditions for about three hours under agitation, to bring about the polycondensation of the prepolymer and formation of the polyester resin.

The polyester resin formed had an intrinsic viscosity of 0.92, a carboxyl content value of 12 (meq./kg.), a melting point of about 263° C., and a diethylene glycol content of 0.52%.

The intrinsic viscosity of the polyester resins produced in the above examples were determined in a 60% phenol and 40% tetrachloroethane solution, wt./wt., at 30° C. The other analytical values set forth in the examples were determined by conventional laboratory procedures.

The above examples indicate that cerium acetylacetonate and lead acetylacetonate are very effective transesterification catalysts as indicated by the half-times, diethylene glycol contents, and carboxyl content values of the polyester prepolymers formed.

The prepolymers prepared in the above examples were readily polycondensed with the use of conventional polycondensation catalysts to form polyester resin products which exhibit all of the physical and chemical properties which make them particularly suitable for filament-forming purposes.

While the process of the present invention has been described with particular reference to polyethylene terephthalate, it will be obvious that the present invention includes within its scope the preparation of other similar polymeric polymethylene terephthalates. For example, it includes within its scope the preparation of other polymeric polymethylene terephthalates formed from glycols of the series $HO(CH_2)_nOH$, wherein n is 2 to 10 and various dialkyl esters of terephthalic acid and copolyesters formed from combinations with other esters of suitable dicarboxylic acids such as isophthalic acid.

We claim:

1. In the process for the preparation of polyethylene terephthalate resin wherein dimethyl terephthalate and ethylene glycol are transesterified and the resulting transesterified product is polycondensed in the presence of a conventional polycondensation catalyst, the improvement comprising carrying out the said transesterification reaction in the presence of a catalytic amount of a transesterification catalyst selected from the group consisting of cerium acetylacetonate and lead acetylacetonate.

2. The process of claim 1 wherein the transesterification catalyst is present in an amount ranging from 0.01% to about 0.20%, based on the weight of the dimethyl terephthalate in the reaction mixture.

3. The process of claim 1 wherein the transesterification catalyst is cerium acetylacetonate.

4. The process of claim 1 wherein the transesterification catalyst is lead acetylacetonate.

References Cited

UNITED STATES PATENTS 2,857,363  10/1958  Easley et al. _____ 260—75

FOREIGN PATENTS 1,297,516  5/1962  France.

WILLIAM SHORT, Primary Examiner

LOUISE P. QUAST, Assistant Examiner

U.S. Cl. X.R.

260—475